United States Patent [19]

Srinivasan et al.

[11] Patent Number: 4,599,156
[45] Date of Patent: Jul. 8, 1986

[54] ELECTRODIALYSIS PROCESS FOR PREPARING HYDROGEN FLUORIDE

[75] Inventors: Viswanathan Srinivasan; Carl O. Quicksall, both of Terre Haute, Ind.

[73] Assignee: International Minerals & Chemical Corp., Terre Haute, Ind.

[21] Appl. No.: 781,016

[22] Filed: Sep. 27, 1985

[51] Int. Cl.$^4$ ............................................. B01D 13/02
[52] U.S. Cl. ........................ 204/182.4; 204/182.3; 423/483; 423/484; 423/485
[58] Field of Search ................ 423/483, 484, 485; 204/182.4, 182.3

[56] References Cited

U.S. PATENT DOCUMENTS

| | | | |
|---|---|---|---|
| 2,815,320 | 12/1957 | Kollsman | 204/182.4 |
| 2,835,632 | 5/1958 | Kollsman | 204/182.4 |
| 3,450,609 | 6/1969 | Carlin | 204/103 |
| 3,705,846 | 12/1972 | Kato et al. | 204/182.4 |
| 3,787,304 | 1/1974 | Chlanda et al. | 204/180 P |
| 4,056,604 | 11/1977 | Thompson et al. | 423/483 |
| 4,107,264 | 8/1978 | Nagasubramanian et al. | 423/81 |

Primary Examiner—Arthur P. Demers
Attorney, Agent, or Firm—Thomas L. Farquer; Joseph M. Skerpon

[57] ABSTRACT

Hydrogen fluoride is produced by the electrodialysis of an alkali metal fluoride salt solution or an ammonium fluoride solution in an electrodialysis cell having an anode compartment and a cathode compartment spaced from one another by an inner electrodialysis compartment bounded by spaced cation exchange membranes.

8 Claims, 3 Drawing Figures

ANHYDROUS HF RECOVERY FROM $H_2SiF_6$

FIG. 1　ANHYDROUS HF RECOVERY FROM $H_2SiF_6$

ELECTRODIALYSIS PROCESS FOR PREPARING HYDROGEN FLUORIDE

BACKGROUND OF THE INVENTION

1. Field of the Invention

This invention relates to a process for preparing hydrogen fluoride by electrodialysis of a fluoride solution. In particular, this invention relates to a process in which an aqueous fluoride solution such as a concentrated solution of ammonium fluoride, is electrodialyzed to produce hydrogen fluoride using an electrodialysis cell having an anode compartment with an anode immersed in an anolyte and a cathode compartment with a cathode immersed in a catholyte separated from one another by an inner electrodialysis compartment, said inner electrodialysis compartment bounded by two spaced cation exchange membranes.

2. Description of the Prior Art

Fluosilicic acid ($H_2SiF_6$) and tetrafluorosilane ($SiF_4$), which is easily hydrolyzed to fluosilicic acid, are by-products formed during the acidification of phosphate rock in the preparation of wet process phosphoric acid. These compounds can usually be recovered as aqueous scrubber by-products from attack tanks and evaporators of the phosphoric acid manufacturing facility. Unfortunately, fluosilicic acid is generally considered a waste material and is viewed as a disposal problem.

Hydrogen fluoride and hydrofluoric acid on the other hand, are key chemicals in almost all fluorinating processes and also find wide application as catalysts and reaction media in non-fluorinating processes. Recognizing this fact, the prior art has sought to develop various methods for producing hydrofluoric acid (hydrogen fluoride) from fluosilicic acid. In one process, fluosilicic acid is flame hydrolyzed to silica ($SiO_2$), tetrafluorosilane, hydrogen fluoride and water vapor followed by selective solvent absorption of the hydrogen fluoride. It also is known to hydrolyze fluosilicic acid using a base such as an alkali metal hydroxide or ammonium hydroxide to produce an aqueous alkali metal or ammonium fluoride salt solution and solid silica. The silica is removed by filtration, the fluoride salt solution is concentrated by evaporation and hydrogen fluoride is produced by thermal decomposition of the fluoride salt or by its reaction with a strong mineral acid such as phosphoric acid or sulfuric acid. Due to the high energy requirements of these processes, however, neither has been commercialized.

It also is known to produce hydrogen fluoride from aqueous fluoride salt solutions, e.g., those produced by base hydrolysis of fluosilicic acid, using electrolytic treatment. Carlin U.S. Pat. No. 3,450,609, for example, describes an arrangement in which hydrogen fluoride is generated at the anode of an electrolytic cell using an alkali metal fluoride or ammonium fluoride solution as the catholyte and an electrically conductive anolyte of hydrofluoric acid separated from one another by an anion exchange membrane.

The prior art also discloses the use of electrodialytic water-splitting using bipolar membranes for producing hydrogen fluoride from alkali metal and ammonium fluoride solutions, e.g., see Chlanda et al. U.S. Pat. No. 3,787,304 and Nagasubramanian et al. U.S. Pat. No. 4,107,264. One disadvantage of this arrangement is that the significant pH gradient established across the bipolar membrane is very detrimental to the membrane's integrity and its useful life.

It is an object of the present invention to provide an improved process for producing hydrogen fluoride from aqueous streams containing alkali metal or ammonium fluoride using electrodialysis. The aqueous alkali metal or ammonium fluoride preferably is obtained from by-product fluorine compounds produced in the manufacture of wet process phosphoric acid.

This and other objects which will be apparent to those skilled in the art are achieved by the present invention.

SUMMARY OF THE INVENTION

In accordance with the present invention, hydrogen fluoride is produced by electrodialyzing an alkali metal fluoride or an ammonium fluoride solution in an electrodialysis cell having an anode compartment with an anode immersed in an anolyte, and a cathode compartment with a cathode immersed in a catholyte separated from one another by an inner compartment, said inner compartment bounded by two spaced cation exchange membranes. The hydrogen fluoride product is recovered from the inner compartment.

DETAILED DESCRIPTION

In the broad practice of the present invention, the alkali metal fluoride solution or ammonium fluoride solution needed for the electrodialysis process of this invention can be obtained from any suitable source. Such sources will be recognized by those skilled in this art. However, the present invention is specifically directed to the use of an alkali metal fluoride solution or ammonium fluoride solution obtained by the reaction between fluosilicic acid and the appropriate hydroxide. As long as a molar excess of the hydoxide is used, this reaction produces an alkali metal fluoride salt or ammonium fluoride salt and a silica precipitant in accordance with the following balanced equation (illustrated for the reaction with ammonium hydroxide):

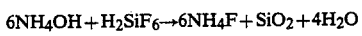

$$6NH_4OH + H_2SiF_6 \rightarrow 6NH_4F + SiO_2 + 4H_2O$$

As those skilled in the art will recognize the quantity of hydroxide reactant for the above reaction can be supplied over a relatively board range although it is preferred that a quantity of hydroxide substantially equivalent to the 6 to 1 molar ratio dictated by the above equation be supplied.

Reaction between the alkali metal hydroxide or ammonium hydroxide and fluosilicic acid generally does not go to completion and the aqueous reaction product, in addition to the fluoride salt, normally will contain unreacted fluosilicic acid and unreacted hydroxide.

Furthermore, the aqueous reaction product normally will be concentrated by evaporative heating. This concentration leads to the formation of the respective bifluoride salt in the aqueous product. Thus, for example, in the illustrated case of ammonium fluoride prepared from fluosilicic acid and ammonium hydroxide, the concentrated aqueous reaction product in addition to ammonium fluoride contains ammonium bifluoride, fluosilicic acid and ammonium hydroxide. As a result, as used in the specification and claims, the term "alkali metal fluoride solution" and the like is intended to embrace aqueous solutions containing an alkali metal fluoride, an alkali metal bifluoride and mixtures thereof; while the term "ammonium fluoride solution" and the like is intended to embrace aqueous solutions containing ammonium fluoride, ammonium bifluoride and mixtures thereof.

In the broad practice of this invention, any of the alkali metal hydroxides, i.e., sodium, lithium, potassium, rubidium or cesium hydroxide can be used to prepare the fluoride source of the present invention. Ammonium hydroxide, however, is the reactant of choice because of the greater solubility of ammonium fluoride in water relative to the alkali metal fluorides. Because of this preference, the present invention will be specifically illustrated using ammonium fluoride. Also in the practice of this invention, as is apparent to those skilled in this art, gaseous ammonia can be used in lieu of ammonium hydroxide.

Figure 1:
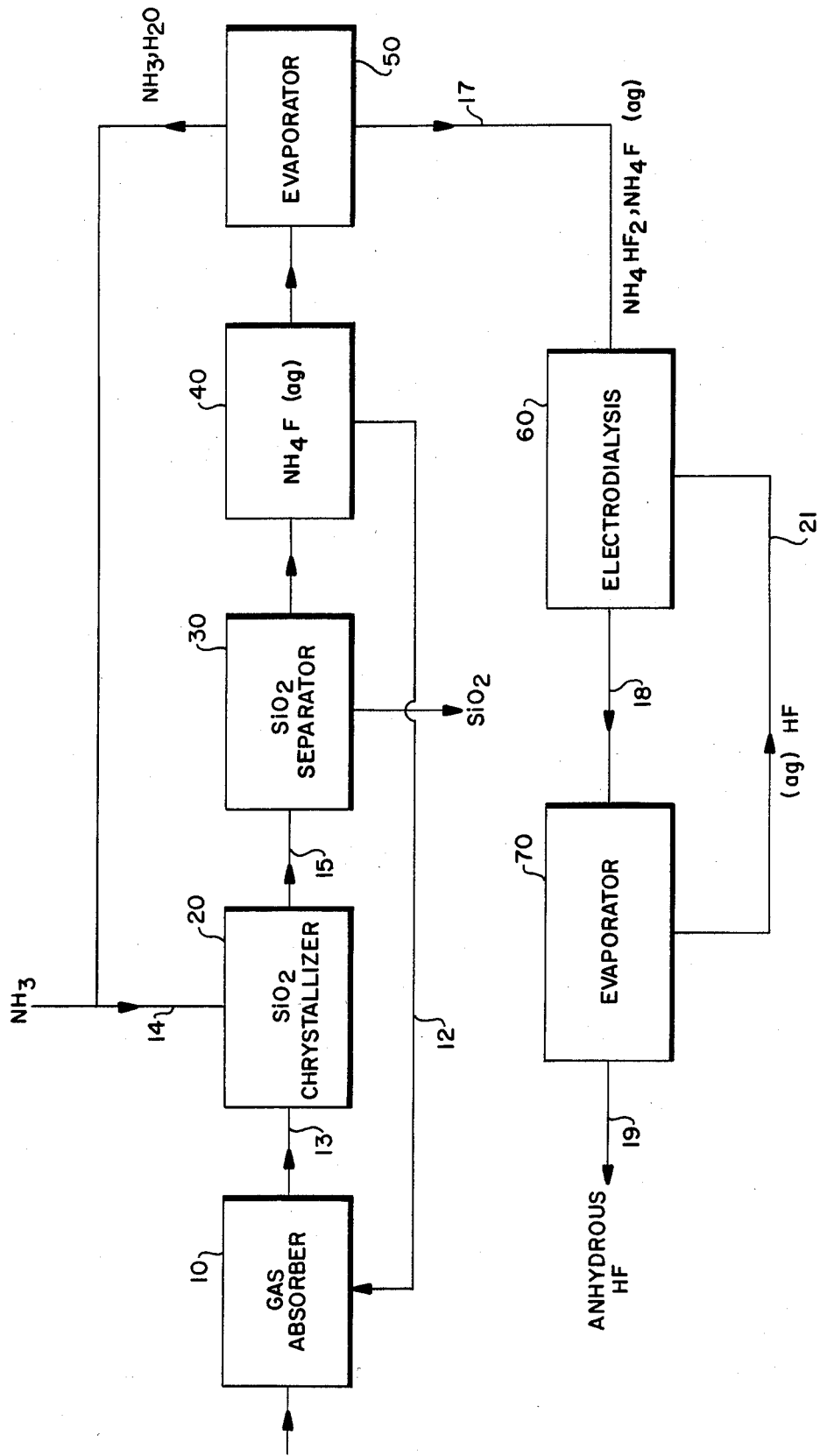
FIG. 1 is schematic flow diagram of a process in which the fluorine values of by-products produced during the acidulation of phosphate rock, i.e., tetrafluorosilane or fluosilicic acid, are converted to hydrogen fluoride.

In FIG. 1, a preferred embodiment for practicing the present invention is illustrated. A by-product gas stream produced during the acidulation of phosphate rock, containing tetrafluorosilane and/or fluosilicic acid is washed with an aqueous scrubbing liquid in gas absorber 10. In this embodiment, a portion of the aqueous ammonium fluoride solution product in tank 40 is passed through line 12 for this purpose. The fluorine-containing aqueous stream produced in absorber 10 then is passed through line 13 to the silica crystallizer 20 where its fluosilicic acid content is reacted with ammonium hydroxide (i.e., ammonia) introduced into silica crystallizer 20 through line 14. The ammonium fluoride and silica reaction products are passed through conduit 15 into silica separator 30 where the solid silica is removed from the aqueous ammonium fluoride product solution. Any conventional solids-liquid separation device can be used for this separation, for example a centrifuge. The ammonium fluoride solution then is passed to surge tank 40.

One portion of the aqueous ammonium fluoride solution accumulated in tank 40 is recirculated through line 12 as the wash liquid for absorbing the by-product fluorine compounds in gas absorber 10; while the remaining portion may be passed to evaporator 50 where the fluoride concentration of the ammonium fluoride solution can be increased. The concentration of the ammonium fluoride solution in tank 40 is a function of many variables particularly the concentration of fluosilicic acid in conduit 13 and the reaction temperature of crystallizer 20. While the present invention can be carried out using relatively dilute fluoride salt solutions, preferably, the concentration of the fluoride salt is increased as needed to about 35–55% in evaporator 50. Ammonia and water discharged from evaporation vessel 50 can be conveniently recycled to silica crystallizer 20 as a portion of the necessary reactants. Concentrated ammonium fluoride solution then is passed through line 17 to electrodialysis cell 60.

In electrodialysis cell 60, the design and operation of which will be described in detail hereinafter, the ammonium fluoride solution is separated (dialyzed) under the influence of an electric field to produce a hydrogen fluoride product. The hydrogen fluoride product is passed through line 18 to evaporator 70. Provided that the hydrogen fluoride electrodialysis product has a hydrogen fluoride concentration above its azeotropic concentration of about 38%, its subsequent evaporative concentration in evaporator 70 yields a stream of anhydrous hydrogen fluoride in line 19 and a recycle stream of hydrofluoric acid in line 21. The present invention, however, is not to be limited to producing a hydrogen fluoride product above its azeotropic concentration, but broadly encompasses the electrodialytic preparation of any suitable concentration of hydrogen fluoride from a fluoride salt solution.

Figure 2:
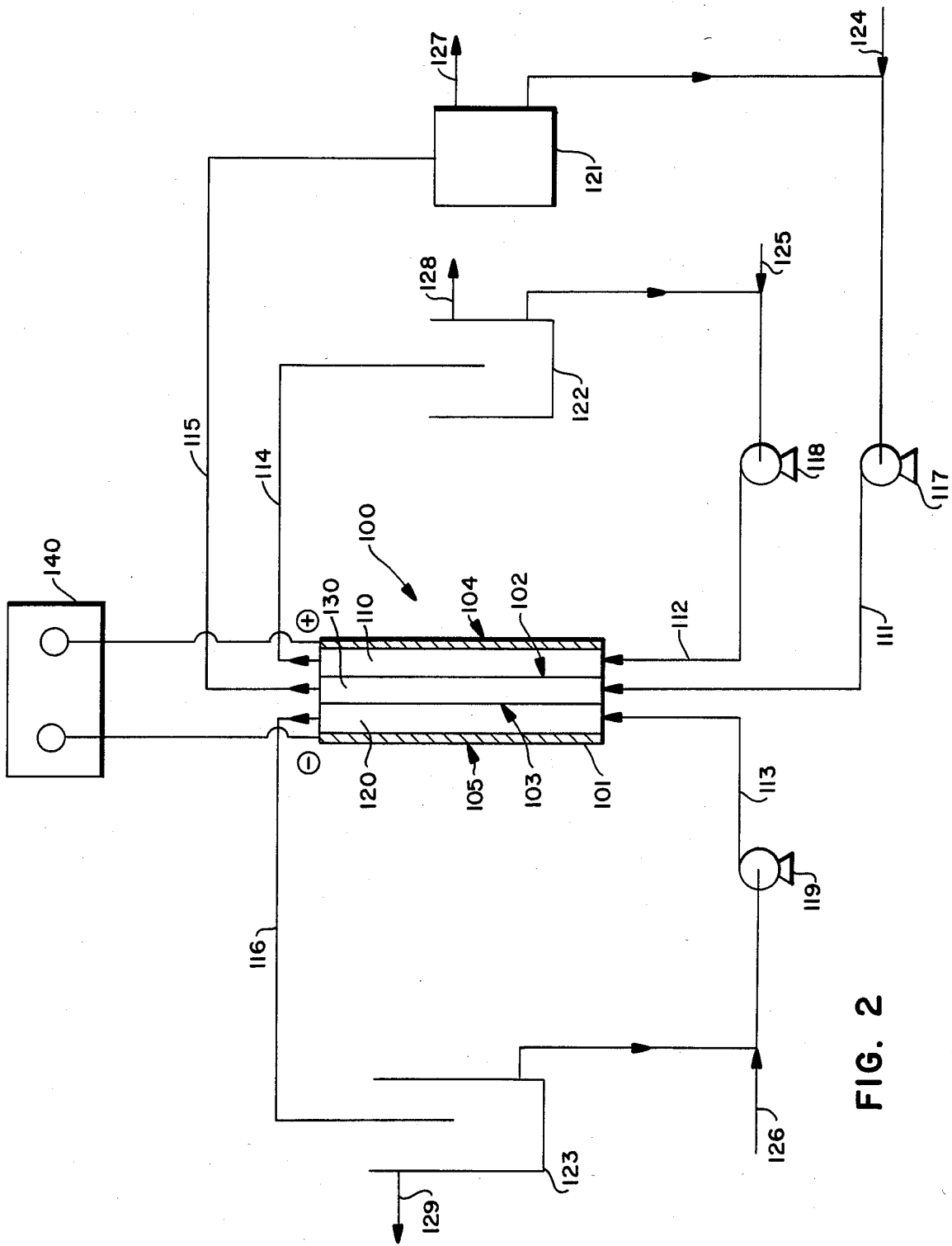
FIG. 2 schematically illustrates a three compartment electrodialysis cell and ancillary equipment useful in practicing one aspect of the FIG. 1 process.

Referring now to FIG. 2, an electrodialysis cell and ancillary equipment for practicing the present invention is illustrated. The electrodialysis cell 100 employed in the present invention can be constructed of conventional materials which are inert to the electrolytes used as the anolyte and catholyte, the alkali metal fluoride or ammonium fluoride feed solution and the various products produced as a result of the electrodialysis process. In the present invention, the electrodialysis cell typically can be constructed of plastics such as polyethylene, polypropylene or phenol formaldehyde resins; also halogenated polymers (preferably fluorinated) such as polytetrofluorethylene and polyvinylidene fluoride or other non-conductive, corrosion resistant materials can be used. The plastics may be reinforced with molded-in fibers, cloths or web. For large scale construction the electrodialysis cell body may be fabricated from conventional materials such as steel, concrete or stressed concrete and then lined with the noted plastic materials.

In its simplest configuration, the electrodialysis cell contains an anode compartment 110, a cathode compartment 120 and an inner electrodialysis compartment 130. These compartments are formed by the outer wall 101 of the cell itself and two spaced, cation exchange membranes 102 and 103.

The anode 104 employed in the anode compartment of the electrodialysis cell can be lead dioxide, lead dioxide coated graphite, impregnated graphite, or another suitable material which is substantially resistant to the action of any of the anolytes suitably used in the present invention and any of the products produced in the anode compartment. The cathode 105 of the cathode compartment can be fabricated from graphite felt, steel, nickel, iron or any other suitable material which is substantially resistant to the catholytes used in the present invention and any of the products formed in the cathode compartment. It is preferred that the material used as the cathode have a low hydrogen over-voltage value. As recognized by those skilled in the art, the selection of a particular material of construction for the anode and cathode generally represents an optimization between electrode cost and electrode life. Other suitable materials for use as the anode or cathode will be recognized by those skilled in the art.

The distance between cathode 105 and anode 104 is fixed by spacers (not shown), which also serve as electrolyte flow distributors, and the combined thickness of the two cation exchange membranes 102 and 103. Typically, the interelectrode distance can vary from about 2 mm to about 5 mm. Generally a smaller interelectrode distance, of on the order of about 3-25 mm, is preferred to minimize the voltage drop in the electrolyte.

The cation exchange membranes 102 and 103 employed in the electrodialysis cell 100 of this invention can be selected from any of the known cation exchange membranes conventionally employed in electrolytic processes, provided that such membranes are resistant to the corrosive environment encountered in the electrodialysis cell of the present invention. Suitable examples of cation exchange membranes useful in the practice of the present invention are well known in the electrolysis art and need not be described in detail here. Suitable commercially available cation exchange membranes include Nafion ® 324 which is fabricated of a hydrolyzed copolymer of tetrafluorethylene and a fluorosulfonated perfluorovinyl ether available from DuPont. Other commercial sources of suitable membranes are RAI Research Corp. and Ionics.

The membranes employed are normally thin flat sheets, normally rectangular, but various other shapes and configurations may be employed. The membranes typically will have a thickness between about 0.05 to 0.5 mm, and preferably between about 0.1 to 0.3 mm. As recognized by those skilled in this art, the membranes may be supported by a suitable filament or fiber network, constructed for example of polytetrafluoroethylene.

It is desirable that the cation exchange membranes exhibit a high selectivity, i.e. the membranes should exclude the passage of anions, have low electrical resistance so as to permit a free flow of cations therethrough at low energy requirements, have high mechanical strength and be highly resistant to various forms of degradation. One advantage of using only cation exchange membranes in the present invention is that the selectivity of commercially available cation exchange membranes for passing cations and blocking the transport of anions tends to be higher than the corresponding selectivity of anion exchange membranes.

Selection of an appropriate anolyte and an appropriate catholyte for operation of the electrodialysis cell of the present invention although not critical is very important. In general, any electrically-conductive liquid that is not harmful to the operation of the electrodialysis cell potentially can be used. By electrically conductive is meant that the conductivity of the anolyte or catholyte is sufficient to allow the free flow of ions.

Generally, a hydrogen ion generating acid is suitable for use as the anolyte. The acid may also contain other salts such as ammonium sulfate which are compatible with the alkali metal fluoride or ammonium fluoride salt solution. As appreciated by those skilled in this art, selection of a particular anolyte is in large part dependent upon the anode composition and the reaction desired at the anode.

Generally, more flexibility is available in the selection of a catholyte. As with the anolyte, however, compatibility with the cathode composition is an important consideration. Materials suitable for use as the catholyte include various acids and salts solutions such as phosphoric acid and alkali metal halide salts.

Typically, wet process phosphoric acid can be used as the catholyte while sulfuric acid of various concentrations or a higher purity phosphoric acid can be used as the anolyte. Wet process phosphoric acid (26-32% $P_2O_5$) is the preferred catholyte while sulfuric acid (about 15-40% $H_2SO_4$) is the preferred anolyte. Since no available cation selective membrane is perfect and will pass some anions under the influence of an electric field, the higher the concentration of anions in the catholyte the greater the migration of such ions through the membrane into the inner compartment. This is undesirable since it degrades the purity of the hydrogen fluoride product recovered from the inner compartment.

In general, the current density applied to the electrodialysis cell to drive the desired electrodialytic separation can be varied over a wide range. Typically, the current density will be within the range of between about 1.5 and about 95 amps per square decimeter and preferably will range between about 15.0 and 45.0 amps per square decimeter. The voltage potential applied across the anode 104 and cathode 105 of the electrodialysis cell of the present invention also can vary over a broad range. Typically, at the above noted current densities the voltage potential will be between about 1 and 12 volts and in preferred practice will be between about 2 and 5 volts. Decreasing the current density, decreases the voltage drop across the cell. While this tends to increase the life of the electrodes, it also increases the size of the electrodes needed for a given level of production. Those skilled in this art will recognize an appropriate optimum arrangement.

The temperature for operating the electrodialysis cell also can vary over a wide range, however, in general the temperature should be maintained from about ambient to up to about 50° degrees C. Higher temperatures normally lead to higher rates of corrosion, degradation of the cationic selective membranes and other structural problems.

A typical embodiment of the electrodialysis proces of the present invention will now be described with reference to FIG. 2. An ammonium fluoride solution such as that prepared by the reaction of fluosilicic acid with ammonium hydroxide is introduced into the inner electrodialysis compartment 130 of electrodialysis cell 100 through line 111. A solution of sulfuric acid, typically, 10-50% hydrogen sulfate by weight is fed through line 112 to the anode compartment 110, which is separated from the inner compartment by cation exchange membrane 102. The cathode compartment 120, which is separated from the inner compartment by the other cation exchange membrane 103, is fed wet process phosphoric acid (26-32% $P_2O_5$) through line 113. The various streams are continuously circulated through their respective compartments using appropriate pumps 117, 118 and 119, dialysate circulation vessel 121, anolyte circulation vessel 122 and catholyte circulation vessel 123 respectively.

Under the influence of a direct electric current generated by power supply 140, hydrogen ions (protons) pass from the anode compartment 110 through the cation exchange membrane 102 into the inner compartment 130, while ammonium ions in the inner compartment 130 pass through the cation exchange membrane 103 into the cathode compartment 120. The cation exchange membranes substantially prevent anions in the various compartments from diffusing in the opposite direction. Ammonium ions preferentially migrate out of the inner compartment 130 through the cation exchange membrane 103 and collect in the cathode compartment 120 due to the fact that the ionization of hydrogen fluoride in the inner compartment in accordance with the following equation:

$$HF \rightleftharpoons H^+ + F^-$$

is relatively small relative to the ionization of ammonium fluoride in accordance with the equation:

$$NH_4F \rightleftharpoons NH_4^+ + F^-$$

Thus, the concentration of free protons available for migration from the inner compartment is relatively small in relation to the free ammonium ion concentration, and ammonium ions will preferentially migrate into the cathode compartment, resulting in a concentration of protons and a depletion of ammonium ions in the inner compartment. Since the inner compartment is bounded by cation exchange membranes 102 and 103, fluoride ions in this compartment are prevented from passing out of it. Thus, the accumulation of protons in the inner compartment results in the preferential formation of hydrogen fluoride.

The arrangement of FIG. 2 can be operated in either batchwise or continuous fashion. When operated batchwise, fixed volumes of dialysate, anolyte and catholyte are initially fed to the respective circulation vessels 121, 122, and 123 and thereafter are circulated through the electrodialysis cell 100 for a desired period of time. This mode of operation is illustrated in Example 1. For continuous operation, recirculating streams of dialysate, anolyte and catholyte are established as in batchwise operation while fresh dialysate, anolyte and catholyte streams are supplied to the recirculating streams via conduits 124, 125 and 126 respectively and spent (product) dialysate, spent anolyte and spent catholyte streams are removed via conduits 127, 128 and 129 respectively, typically as overflows from the circulating vessels. This mode of operation is illustrated in Example 3.

Figure 3:
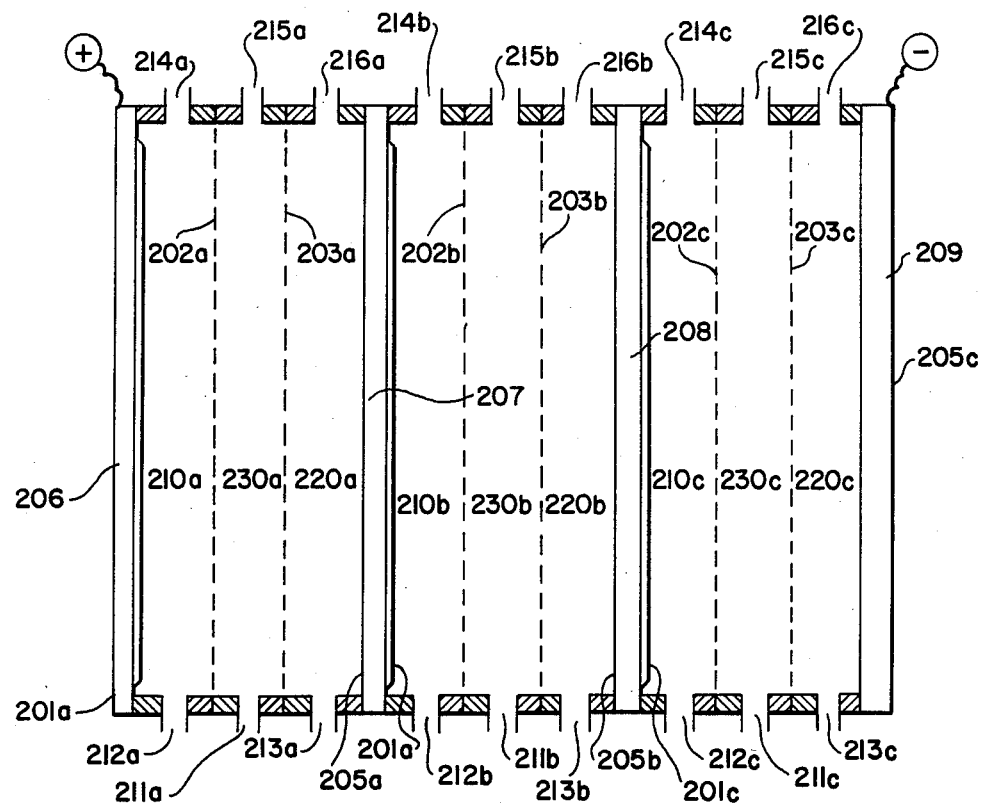
FIG. 3 schematically illustrates a bipolar electrode arrangement providing a plurality of the three compartment electrodialysis cells useful in practicing the present invention.

Preferably, a plurality of the elctrodialysis cells of FIG. 2 are grouped together. A particularly desirable arrangement for this purpose is the bipolar electrode configuration schematically shown in FIG. 3. The apparatus consists of the spaced electrodes 206 through 209, interposed membranes 202a-202c and 203a-203c, end plates, gaskets, spacers and flow ports. The end plates (not shown) help to clamp the various elements of the assembly together. The gaskets and spacers help to define the various anolyte 210a-c; catholyte 220a-c and inner dialysis chambers 230a-c, and provide a tight seal between the adjacent compartments. The spacers are provided with flow ports 211a-c, 212a-c and 213a-c for feeding and flow ports 214a-c, 215a-c and 216a-c for removing various streams from the respective compartments. Various pumps and surge tanks (not shown) also are used to enable circulation of the various streams.

In this arrangement a D.C. voltage is imposed across electrodes 206 and 209 which function as anode 201a and cathode 205c respectively. This overall voltage drop is divided among the three compartments with electrodes 207 and 208 each functioning as a bipolar electrode. Electrode 207 constitutes cathode 205a and anode 201b, while electrode 208 constitutes cathode 205b and anode 201c. The electrodes can all be fabricated from graphite while the anode side of each appropriate electrode is provided with a lead dioxide coating. Operation of the FIG. 3 arrangement is otherwise in accordance with the embodiment of FIG. 2.

The following examples are included for illustrative purposes only and are not intended to limit the scope of this invention.

EXAMPLE 1

A laboratory scale electrodialysis system, similar to that shown schematically in FIG. 2 was fabricated and operated in a batchwise mode. The electrodialysis cell was of a plate and frame type and consisted of three electrolyte flow distributors, two Nafion ® 324 cation exchange membranes, a graphite felt press-fitted to a flat graphite plate cathode and a lead dioxide anode. The electrodes were spaced 3.2 cm apart and each had an effective area of 8 cm$^2$. Five hundred (500) ml of a catholyte of wet process phosphoric acid (26% $P_2O_5$) was circulated through the cathode chamber and 500 ml of an anolyte of 15% $H_2SO_4$ was circulated through the anode chamber. Three hundred fifty (350) ml of 2.4M ammonium fluoride solution was circulated as the dialysate through the inner electrodialysis compartment.

A constant D.C. voltage of about 5 V was imposed across the electrodes for about 18 hours and electrodialysis was carried out at ambient temperature. The amount of ammonium and fluoride ions in the various compartments then was determined. A summary of the material balance is tabulated in Table I.

TABLE 1

|  | Anolyte | Catholyte | Dialysate |
| --- | --- | --- | --- |
| Ammonium ion charged (g) | 0.0 | 0.4 | 14.8 |
| Ammonium ion recovered (g) | 0.21 | 8.9 | 6.0 |
| Fluorine ion charged (g) | 0.0 | 14.1 | 15.7 |
| Fluorine ion recovered (g) | 0.27 | 13.4 | 16.0 |

As indicated by the Table I data, 60% of the ammonium ions migrated from the inner dialysis compartment to the catholyte compartment while a relatively small amount (less than about 2%) of the fluoride ions migrated to the anode chamber.

EXAMPLE 2

Using the electrodialysis cell of Example 1 having a flat graphite plate cathode and a lead dioxide coated graphite anode, electrodialysis of a feed mixture of 26% ammonium fluoride and 37% hydrogen fluoride was carried out. Six (6.0) liters of wet process phosphoric acid (28% $P_2O_5$) was used as the catholyte and 1.0 l of 40% $H_2SO_4$ was used as the anolyte. The ammonium fluoride feed mixture was delivered to the dialysate circulation vessel at a flow rate of 0.5 ml/min., while the content of the circulation vessel was circulated as the dialysate through the inner dialysis compartment of the cell at a rate of 100 ml/min.

A constant current at a density of about 35 amp/dm$^2$ was applied to the cell. Cell voltage varied between about 10.8 v and 11.8 v. The change in concentration of the circulating dialysate over time is tabulated in Table II.

TABLE II

| Elapsed Time (hours) | Ammonium Ion (%) | Hydrogen Fluoride (%) |
| --- | --- | --- |
| 0 | 12.6 | 37.0 |
| 21 | 6.5 | 43.0 |
| 29 | 7.1 | 42.8 |
| 45 | 5.9 | 43.0 |
| 69 | 3.2 | 45.7 |

Table II clearly shows that hydrogen fluoride concentrations of up to 45.7% could be obtained by a proper choice of ammonium fluoride feed solution to the electrodialysis unit. Such a feed may be available in a commercial set up where the still bottoms from a hydrogen fluoride distillation/rectification unit may contain about 37% HF. When used as a solvent to dissolve solid ammonium fluoride, such a stream will make an excellent feed to an electrodialysis unit of the present invention.

EXAMPLE 3

Using the same electrodialysis set-up of the type used in Example 1, but with a graphite plate cathode, a lead dioxide coated graphite anode, and Teflon ® electrolyte distributor frames, a 37% aqueous ammonium fluoride solution was electrodialyzed continuously. The effective electrode area was 20 cm$^2$ and a current density of 30 A/dm$^2$ was used. Wet-process phosphoric acid (28% $P_2O_5$) was used as a catholyte which was fed continuously to catholyte circulation vessel at a rate of about 5 ml/min and a catholyte overflow at the same rate was collected from the circulation vessel. The contents of the catholyte circulation vessel were circulated through the cathode chamber at about 400 ml/min. Two thousand (2000) ml of 40% $H_2SO_4$ contained in anolyte circulation vessel was used as the anolyte. This anolyte was circulated through the anode chamber at a rate of about 400 ml/min. Aqueous ammonium fluoride (37%) was fed to the dialysate circulation vessel at a rate of 0.32 ml/min and a product stream at the same rate was collected from the vessel as overflow. The contents of the dialysate vessel were circulated through the center dialysate compartment at a rate of about 300 ml/min. The electrodialysis unit was operated for a total of 79.5 hours and the cell voltage ranged from 9 to 10 volts. Table II shows the change in $NH_4^+$ concentration in the product stream and the HF concentration produced as a function of elapsed time.

TABLE III

| Elapsed Time (hours) | $NH_4^+$ Feed (g/hour) | $NH_4^+$ in Product (g/hour) | HF in Product (wt %) |
|---|---|---|---|
| 25 | 4.07 | 0.74 | 18.2 |
| 30 | 4.07 | 0.72 | 18.2 |
| 49 | 4.10 | 0.65 | 17.8 |
| 55 | 4.10 | 0.67 | 17.5 |
| 74.5 | 3.65 | 0.62 | 17.7 |
| 79.5 | 3.65 | 0.57 | 17.3 |

As indicated in Table II, 82 to 84% of the ammonium ions migrated from the center dialysate compartment to the catholyte compartment. Fluoride analysis of the product stream indicated that an HF solution of about 18% was produced.

While specific embodiments of the present invention have been described herein, it will be recognized that various modifications thereof will occur to those skilled in the art. Therefore, the scope of the invention is limited solely by the scope of the appended claims.

We claim:

1. A process for producing hydrogen fluoride using an electrodialysis cell having an anode compartment with an anode immersed in an anolyte and a cathode compartment with a cathode immersed in a catholyte separated from one another by an inner electrodialysis compartment, said inner elctrodialysis compartment bounded by two spaced cation exchange membranes, said process comprising electrodialyzing under the influence of an applied current, an alkali metal fluoride solution or an ammonium fluoride solution fed to said inner electrodialysis compartment so that alkali metal ions or ammonium ions are caused to flow through one of said cation exchange membrane into said catholyte and hydrogen ions are caused to flow through the other cation exchange memebrane into said inner electrodialysis compartment thus forming hydrofluoric acid in said inner electrodialysis compartment.

2. The process of claim 1 wherein said anolyte comprises sulfuric acid.

3. The process of claim 1 wherein said catholyte comprises phosphoric acid.

4. The process of claim 1 wherein an ammonium fluoride solution is fed to said inner compartment.

5. A process for producing hydrogen fluoride from fluosilicic acid comprising reacting said fluosilicic acid with an alkali metal hydroxide or ammonium hydroxide to produce an aqueous fluoride salt solution and silica, separating said aqueous fluoride salt solution from the precipitated silica, evaporatively concentrating said aqueous fluoride salt solution and electrodialyzing said concentrated aqueous fluoride salt solution to produce hydrofuoric acid by feeding said concentrated aqueous fluoride salt solution to an inner electrodialysis compartment of an electrodialysis cell having an anode compartment with an anode immersed in an anolyte and a cathode compartment with a cathode immersed in a catholyte separated from one another by said inner electrodialysis compartment, said inner electrodialysis compartment being bounded by two spaced cation exchange membranes.

6. The process of claim 5 wherein said anolyte comprises sulfuric acid.

7. The process of claim 5 wherein said catholyte comprises phosphoric acid.

8. The process of claim 1 wherein a plurality of said anode, cathode and inner dialysis compartments are grouped together using a bipolar electrode arrangement.

* * * * *